US010143960B2

(12) United States Patent
Sundaram et al.

(10) Patent No.: US 10,143,960 B2
(45) Date of Patent: Dec. 4, 2018

(54) STAGED COMPLEMENTARY PSA SYSTEM FOR LOW ENERGY FRACTIONATION OF MIXED FLUID

(71) Applicant: ExxonMobil Research and Engineering Company, Annandale, NJ (US)

(72) Inventors: Narasimhan Sundaram, Annandale, NJ (US); Hans Thomann, Bedminster, NJ (US); Edward W. Corcoran, Jr., Easton, PA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 149 days.

(21) Appl. No.: 15/339,997

(22) Filed: Nov. 1, 2016

(65) Prior Publication Data

US 2017/0136402 A1     May 18, 2017

Related U.S. Application Data

(60) Provisional application No. 62/256,357, filed on Nov. 17, 2015.

(51) Int. Cl.
*B01D 53/047*     (2006.01)
*B01D 53/04*     (2006.01)

(52) U.S. Cl.
CPC ....... *B01D 53/0423* (2013.01); *B01D 53/047* (2013.01); *B01D 53/0462* (2013.01);
(Continued)

(58) Field of Classification Search
CPC .............. B01D 53/0423; B01D 53/047; B01D 53/0462; B01D 2253/102;
(Continued)

(56) References Cited

U.S. PATENT DOCUMENTS 4,171,207 A * 10/1979 Sircar ....................... C01B 3/56
                                                           95/101
4,264,340 A * 4/1981 Sircar ................ B01D 53/0476
                                                           95/122

(Continued)

FOREIGN PATENT DOCUMENTS

CN           103127747 B     10/2015
EP             0112640 A1      7/1984
(Continued)

OTHER PUBLICATIONS

Diagne et al., "Parametric Studies on CO2 Separation and Recovery by a Dual Reflux PSA Process Consisting of Both Rectifying and Stripping Sections", Industrial & Engineering Chemistry Research, Sep. 1995, pp. 3083-3089, vol. 34, Iss. 9, ACS Publications.
(Continued)

*Primary Examiner* — Frank W Lawrence, Jr.
(74) *Attorney, Agent, or Firm* — Joseph E. Wrkich; Andrew T. Ward

(57) ABSTRACT

A staged complementary pressure swing adsorption system and method for low energy fractionation of a mixed fluid. Two beds in a four-column PSA system are selective for component A, and another two columns are selective for component B. The cycle creates an intermittent A and B product, using the purge effluent from the complementary product fed at an intermediate pressure. This intermittent product is used as purge gas for low-pressure purged elsewhere in the cycle using appropriate storage tanks. The use of an intermediate pressure in this cycle enables continuous production of purified component A and B without the use of compressors. Columns may also be configured to enable pressure to equalize between complementary columns.

25 Claims, 5 Drawing Sheets

(52) U.S. Cl.
CPC .. *B01D 2253/102* (2013.01); *B01D 2253/104* (2013.01); *B01D 2253/108* (2013.01); *B01D 2253/116* (2013.01); *B01D 2253/1124* (2013.01); *B01D 2253/204* (2013.01); *B01D 2256/10* (2013.01); *B01D 2256/20* (2013.01); *B01D 2256/245* (2013.01); *B01D 2257/102* (2013.01); *B01D 2257/104* (2013.01); *B01D 2257/40* (2013.01); *B01D 2257/504* (2013.01); *B01D 2257/7022* (2013.01); *B01D 2257/7025* (2013.01); *B01D 2259/404* (2013.01); *B01D 2259/40015* (2013.01); *B01D 2259/40022* (2013.01); *B01D 2259/40033* (2013.01); *B01D 2259/40045* (2013.01); *B01D 2259/40052* (2013.01); *B01D 2259/40066* (2013.01); *B01D 2259/414* (2013.01)

(58) Field of Classification Search
CPC ........ B01D 2253/104; B01D 2253/108; B01D 2253/1124; B01D 2253/116; B01D 2253/204; B01D 2256/10; B01D 2256/20; B01D 2256/245; B01D 2257/102; B01D 2257/204; B01D 2257/40; B01D 2257/504; B01D 2257/7022; B01D 2257/7025; B01D 2259/40015; B01D 2259/40022; B01D 2259/40033; B01D 2259/40045; B01D 2259/40052; B01D 2259/40066; B01D 2259/404; B01D 2259/414
USPC ..... 95/96–98, 100, 130, 138, 139, 141, 143, 95/144; 96/121, 131, 132
See application file for complete search history.

(56) References Cited

U.S. PATENT DOCUMENTS

| | | | |
|---|---|---|---|
| 4,271,664 A | 6/1981 | Earnest | |
| 4,299,596 A | 11/1981 | Benkmann | |
| 4,744,803 A | 5/1988 | Knaebel | |
| 4,790,858 A * | 12/1988 | Sircar ................ | B01D 53/0476 95/101 |
| 4,858,428 A | 8/1989 | Paul | |
| 4,880,443 A * | 11/1989 | Miller .................... | B01D 53/04 95/127 |
| 5,085,764 A | 2/1992 | Meyers et al. | |
| 5,355,668 A | 10/1994 | Weil et al. | |
| 5,707,425 A | 1/1998 | D'Amico et al. | |
| 6,290,751 B1 | 9/2001 | Ragil et al. | |
| 6,610,124 B1 | 8/2003 | Dolan et al. | |
| 6,902,602 B2 | 6/2005 | Keefer et al. | |
| 7,763,099 B2 | 7/2010 | Verrna et al. | |
| 8,262,773 B2 | 9/2012 | Northrop et al. | |
| 8,337,594 B2 | 12/2012 | Corma Canos et al. | |
| 8,557,218 B2 | 10/2013 | Sundaram et al. | |
| 2005/0271914 A1 | 12/2005 | Farooque et al. | |
| 2009/0064653 A1 | 3/2009 | Hagen et al. | |
| 2012/0006193 A1* | 1/2012 | Roychoudhury .... | B01D 53/047 95/11 |
| 2012/0125194 A1 | 5/2012 | Caram et al. | |
| 2012/0318533 A1 | 12/2012 | Keller et al. | |
| 2013/0014484 A1 | 7/2013 | Caprile et al. | |
| 2013/0333391 A1 | 12/2013 | Sundaram et al. | |
| 2013/0340620 A1* | 12/2013 | Sundaram .......... | B01D 53/0407 96/126 |
| 2014/0230445 A1 | 8/2014 | Huntington | |
| 2014/0272613 A1 | 9/2014 | Berlowitz et al. | |

FOREIGN PATENT DOCUMENTS

| | | |
|---|---|---|
| EP | 0212494 A1 | 3/1987 |
| EP | 0923976 A1 | 6/1999 |
| EP | 1022045 A2 | 7/2000 |
| EP | 1413546 A1 | 4/2004 |
| EP | 2220338 B1 | 7/2011 |
| WO | 2008151913 A1 | 12/2008 |
| WO | 2009120779 A2 | 10/2009 |
| WO | 2010044958 A1 | 4/2010 |
| WO | 2010147885 A1 | 12/2010 |
| WO | 2012003079 A1 | 1/2012 |
| WO | 2013062754 A1 | 5/2013 |

OTHER PUBLICATIONS

Reijers et al., "Modeling Study of the Sorption-Enhanced Reaction Process for CO2 Capture. i. Model Development and Validation", Industrial & Engineering Chemistry Research, Jun. 23, 2009, pp. 6966-6974, vol. 48, ACS Publications.

Bensaid et al., "Power and Hydrogen Co-generation from Biogas +", Energy & Fuels, Sep. 16, 2010, pp. 4743-4747, vol, 28, iss. 9, American Chemical Society.

Wright et al., "CAESAR: Development of a SEWGS model for IGCC", Energy Procedia, 2011, pp. 1147-1154, vol. 4, Elsevier, ScienceDirect.

Manzolini et al., CO2 Separation From Combined Cycles Using Molten Carbonate Fuel Cells, Journal of Fuel Cell Science and Technology, Feb. 2012, pp. 11018-1 to 11018-8, vol. 9, iss, 1, American Society of Mechanical Engineers.

PCT/US2016/059819 Invitation to Pay Additional Fees dated Feb. 17, 2017.

PCT/US2016/059907 International Search Report and Written opinion dated Feb. 10, 2017.

PCT/US2016/059822 International Search Report and Written opinion dated Jan. 31, 2017.

PCT/US2016/059911 International Search Report arid Written opinion dated Jan. 25, 2017.

PCT/US2016/059916 Invitation to Pay Additional Fees dated Feb. 9, 2017.

PCT/US2016/059912 International Search Report and Written opinion dated Feb. 8, 2017.

* cited by examiner

STAGED COMPLEMENTARY PSA SYSTEM FOR LOW ENERGY FRACTIONATION OF MIXED FLUID

CROSS-REFERENCE TO RELATED APPLICATIONS

This application claims priority to U.S. Provisional Application Ser. No. 62/256,357 filed on Nov. 17, 2015, herein incorporated by reference in its entirety.

FIELD

The present invention relates to low energy fractionation of a mixed fluid by using a staged complementary pressure swing adsorption system.

BACKGROUND

There is a growing need for the creation of energy efficient processes for the separation of multicomponent mixtures. The need for energy efficiency in this context has been augmented recently by environmental concerns. The separation of multicomponent mixtures is desirable for many reasons, most notably for use and production of a variety of industrial products. The distillation of propane and propylene illustrates this problem. This process is well known to be a very energy-intensive process and poses serious environmental risk.

Recent advances in material sciences have brought promise to this area, as a plethora of new materials have become available that can be used to selectively adsorb certain molecules from a gas. Modern adsorption processes have taken advantage of these materials as many of these processes employ the use of two different adsorption materials to separate multicomponent mixtures in the air.

Pressure swing adsorption (PSA) relies on swinging or cycling pressure over a bed of adsorbent through a range of values. In PSA processes, a gaseous mixture is conducted under pressure for a period of time over a first bed of a solid sorbent that is selective, or relatively selective, for one or more components, usually regarded as a contaminant, to be removed from the gaseous mixture. For example, a feed can be introduced into a PSA apparatus at a feed pressure. At the feed pressure, one or more of the components (gases) in the feed can be selectively (or relatively selectively) adsorbed, while one or more other components (gases) can pass through with lower or minimal adsorption. A component (gas) that is selectively adsorbed can be referred to as a "heavy" component of a feed, while a gas that is not selectively adsorbed can be referred to as a "light" component of a feed. For convenience, a reference to the "heavy" component of the feed can refer to all components (gases) that are selectively adsorbed, unless otherwise specified. Similarly, a reference to the "light" component can refer to all components (gases) that are not selectively adsorbed, unless otherwise specified. After a period of time, the feed flow into the PSA apparatus can be stopped. The feed flow can be stopped based on a predetermined schedule, based on detection of breakthrough of one or more heavy components, based on adsorption of the heavy component(s) corresponding to at least a threshold percentage of the total capacity of the adsorbent, or based on any other convenient criteria. The pressure in the reactor can then be reduced to a desorption pressure that can allow the selectively adsorbed component(s) (gas(es)) to be released from the adsorbent. Optionally, one or more purge gases can be used prior to, during, and/or after the reduction in pressure to facilitate release of the selectively adsorbed component(s) (gas(es)). Depending on its nature, a full PSA cycle can optionally be performed at a roughly constant temperature. As PSA is usually enabled by at least adsorption and usually occurs on gaseous components, the terms "adsorption"/"adsorbent" and "gas(es)" are used as descriptors in the instant specification and claims, without intending to be limiting in scope, even though "absorption"/"absorbent"/"sorbent"/"sorption" and "component(s)" may be more generally applicable.

Multiple beds can be used to enable a complete cycle, where typically every bed sequentially goes through the same cycle. When a first PSA reactor satisfies a condition, such as the adsorbent in the reactor becoming sufficiently saturated, the feed flow can be switched to a second reactor. The first PSA reactor can then be regenerated by having the adsorbed gases released. To allow for a continuous feed flow, a sufficient number of PSA reactors and/or adsorbent beds can be used so that the first PSA reactor is finished regenerating prior to at least one other PSA reactor satisfying the condition for switching reactors.

U.S. Pat. No. 4,744,803 discusses the use of a four-step PSA cycle. The adsorption bed is first pressurized by entry of gas from the bottom of the bed while the top end of the bed is closed. This is referred to as the pressurization step. The next step is high pressure feed, wherein feed gas enters under pressure from the top of the column and effluent is allowed to escape from the bottom of the column. At the conclusion of this step the column is closed at both ends and the pressurized gas is then released by opening the top end of the column. This is referred to as the blow down step. After the pressure has been reduced to a predetermined level by blowdown, the column is next purged of remaining product by feeding recycled product gas into the bottom end of the bed and allowing the gas remaining in the column to be forced out of the top end as effluent. This step would normally be terminated at the point where the purging gas reaches the top end of the column. The effluents from the blowdown and purge steps contain the component adsorbed by the column. This is generally referred to as the secondary product of the column. The primary product is the component or component which pass through the bed unadsorbed, i.e., the high pressure feed effluent.

U.S. Pat. No. 4,744,803 also provides a PSA system where adsorbents 1 and 2 are disposed in 4 beds, which are respectively selective for species A and B. This system uses the secondary product of one bed (the blow down and purge effluent) partially or wholly as the feed for another bed containing a different, or complementary adsorbent. This system, however, has the disadvantage that compressors are required to feed the secondary product of one feed to another. Thus greatly increasing the energy required to operate the system.

Another process known in the art is dual reflux PSA, described by Diagne et al., Ind. Eng. Chem. Res., Vol. 34 No. 9, 1995. In this process, an intermediate feed position divides an adsorber column into rectifying and stripping sections, and this process relies on external compression to create a constant product.

SUMMARY

The references cited above describe the use of compressors in PSA adsorption systems, and the use of compressors increases energy costs. The reduction or elimination of compressors from a PSA adsorption system would result in a significant decrease in energy costs.

Certain embodiments of the present invention are directed toward a pressure swing adsorption swing system for the fractionation of a multicomponent fluid comprising a first adsorbent column selective for a first component, a second adsorbent column selective for the first component, a third adsorbent column selective for a second component, a fourth adsorbent column selective for the second component; wherein said columns are fed with the multicomponent fluid while pressurized at a high pressure during at least one phase of a pressure swing adsorption cycle that enables a continuous supply of both a highly concentrated first component and a highly a concentrated second component to be recovered throughout the pressure swing adsorption cycle; wherein said columns are depressurized from the high pressure to a first intermediate pressure during at least one phase of the pressure swing adsorption cycle; wherein said columns are purged while pressurized at a second intermediate pressure during at least one phase of the pressure swing adsorption cycle and an intermittent supply of first and second component is created; wherein said columns are depressurized from a third intermediate pressure to a low pressure during at least one phase of the pressure swing adsorption cycle; wherein said columns are purged while pressurized at the low pressure during at least one phase of the pressure swing adsorption cycle by using an effluent from a column selective for a different component or from said intermittent supply; wherein said columns are re-pressurized to the high pressure during at least one phase of the pressure swing adsorption cycle.

Additional embodiments are directed toward a method for fractionation of a multicomponent stream having first and second components and for providing a continuous purified supply of said multicomponent stream using a pressure swing adsorption system having first adsorption columns selective for a first component and second adsorption columns selective for a second component, which comprises of steps of: feeding an adsorption column, selective for the first component, at a high pressure with a stream of the multicomponent gas and generating a product comprising the second component; depressurizing said column to a first intermediate pressure, which is between the high pressure and a low pressure; purging said column at a second intermediate pressure by using one of the product of the second component or from the purge effluent of a column selective for the second component; depressurizing said column from a third intermediate pressure to the low pressure; purging said column at the low pressure by using product of second type of component; and increasing the pressure of said column from to the high pressure.

Further embodiments of the present invention are directed toward a method for fractionation of a multicomponent stream having first and second components and for providing a continuous purified supply of said multicomponent stream using a thermal swing adsorption system, wherein first adsorption columns are used that are selective for the first component and second adsorption columns are used that are selective for the second component, which comprises of steps of: feeding an adsorption column, selective for the first component, at a first high temperature with a stream of the multicomponent stream and generating a product comprising the second component; decreasing the temperature of said column by coming to thermal equilibrium with another column which is at a first low temperature; purging said column at a first intermediate temperature by using one of the product comprising the second component or the purge effluent of a column selective for the second component; purging said column at a second low temperature by using the product comprising the second component; and increasing the temperature of said column from a third low temperature to a third high temperature, by coming to thermal equilibrium with another column which is at higher temperature than said column.

The invention may be embodied by numerous other devices and methods. The description provided herein, when taken in conjunction with the annexed drawings, discloses examples of the invention. Other embodiments, which incorporate some or all steps as taught herein, are also possible.

DETAILED DESCRIPTION

Figure 1:
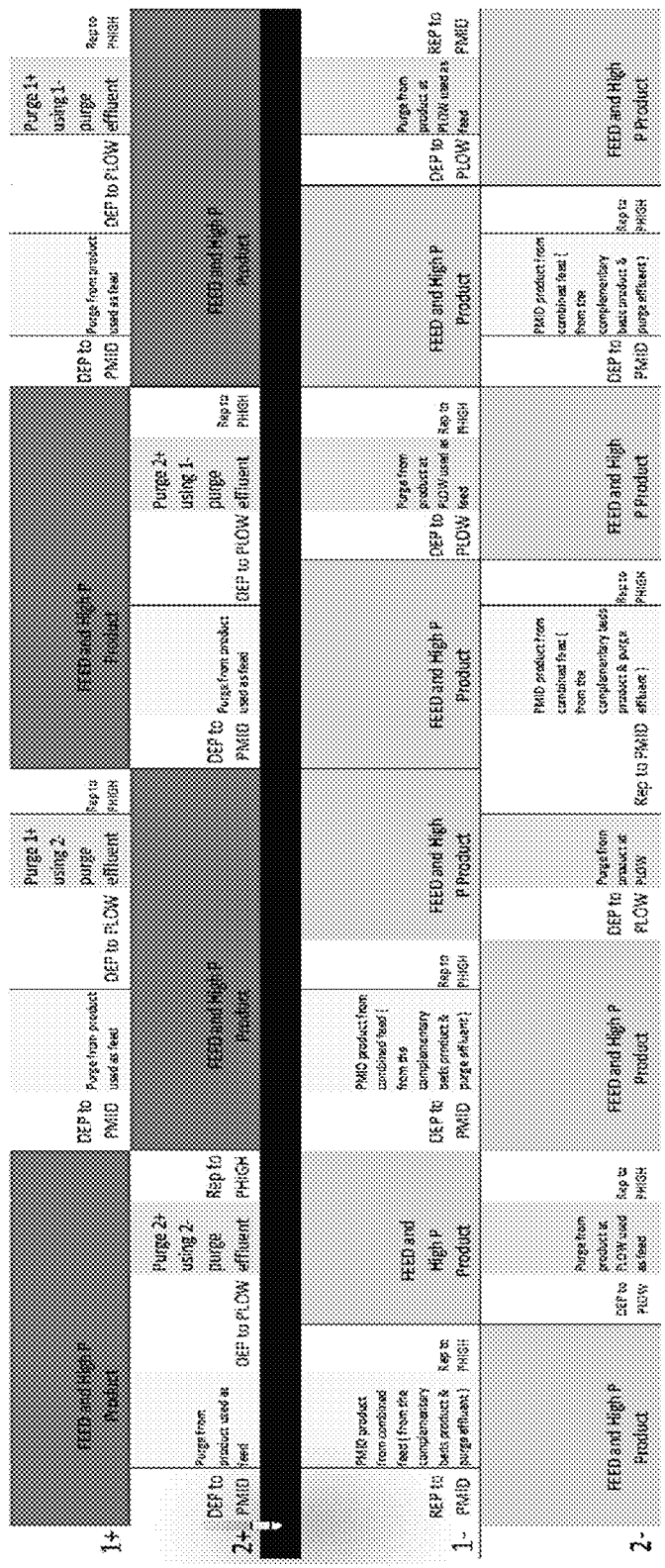
FIG. 1 shows a flow chart depicting the various stages in one cycle for an exemplary four column, staged complementary PSA system for separating components A and B from a feed at minimum energy cost.

In various aspects, systems and methods are provided for low energy fractionation of a mixed fluid by using a staged complementary pressure swing adsorption system. In these embodiments intermediate staged pressure steps are provided in a multi-bed PSA system to enable the pressurization and purging of complementary adsorbent beds such that no compressors are required.

The first embodiment will be described with reference to FIG. 1. The embodiment includes a four bed PSA system, where two of the beds are selective or relativity selective for one of the components of a mixture, while the other two beds are selective or relatively selective for the other component of the mixture. The adsorbent columns (1+) and (2+) are selective for component A, and the adsorbent columns (1−) and (2−) are selective for component B. As will be described, a continuous supply of component A and B product is generated throughout the cycle.

It should be appreciated that the exact timings and pressure of the cycle will vary depending on the particulars of the process and materials used, e.g., the component that is adsorbed and the adsorbent being used. Some examples of molecule combinations this system can be used to separate include nitrogen/methane, nitrogen/carbon dioxide, hydrogen/carbon dioxide, methane/carbon dioxide, argon/oxygen, oxygen/nitrogen, propane/propylene, ethane/ethylene, etc. Depending on the molecules to be separated, different adsorbent materials are used. Such adsorbent materials may include zeolites such as ITQ/H-mordenite for the separation of nitrogen/methane, for example. Other complementary pairs of adsorbents are well known in the art.

Examples of suitable adsorbent materials selective will now be described. Such material includes a mixed metal oxide adsorbent, such as an adsorbent including a mixture of an alkali metal carbonate and an alkaline earth metal oxide and/or a transition metal oxide. Examples of suitable alkali metal carbonates can include, but are not limited to, a carbonate of lithium, sodium, potassium, rubidium, cesium, or a combination thereof, e.g., a carbonate of lithium, sodium, potassium, or a combination thereof. Examples of suitable alkaline earth metal oxides can include, but are not limited to, oxides of magnesium, calcium, strontium, barium, or a combination thereof, e.g., oxides of magnesium and/or calcium. Some examples of suitable transition metal oxides can include, but are not limited to, oxides of lanthanide series metals, such as lanthanum, and/or of transition metals that can form oxides with the metal in a +2 or +3 oxidation state (such as yttrium, iron, zinc, nickel, vanadium, zirconium, cobalt, or a combination thereof).

In some aspects, the carbonate can be selected independently from the oxide in the mixed metal oxide. In such aspects, the carbonate can include, consist essentially of, or be lithium carbonate, sodium carbonate, potassium carbonate, rubidium carbonate, and/or cesium carbonate (e.g., lithium carbonate, sodium carbonate, and/or potassium carbonate; lithium carbonate and/or potassium carbonate; lithium carbonate and/or sodium carbonate; or sodium carbonate and/or potassium carbonate).

In aspects where the carbonate is selected independently from the oxide, the oxide can be an alkaline earth oxide, a transition metal oxide, a combination of two or more alkaline earth oxides, a combination of two or more transition metal oxides, or a combination of oxides including at least one alkaline earth oxide and at least one transition metal oxide. In aspects where the independently selected oxide includes one or more alkaline earth oxides, a suitable alkaline earth oxide can include, consist essentially of, or be magnesium oxide, calcium oxide, strontium oxide, and/or barium oxide, e.g., including at least magnesium oxide and/or calcium oxide.

In aspects where the independently selected oxide includes one or more transition metal oxides, suitable transition metals can include, consist essentially of, or be one or more transition metals that can form oxides with the metal in a +2 or +3 oxidation state (e.g., yttrium oxide, iron oxide, zinc oxide, nickel oxide, vanadium oxide, cobalt oxide, zirconium oxide, lanthanum oxide, other oxides of lanthanide metals, and/or a combination thereof). One preferred option includes a transition metal oxide selected from lanthanum oxide and/or zirconium oxide. Another option includes a metal oxide selected from lanthanum oxide, yttrium oxide, zirconium oxide, and/or zinc oxide. Yet another option includes a metal oxide selected from nickel oxide, cobalt oxide, and/or iron oxide. Mixtures within each of these options and/or across options are also contemplated, such as mixtures of lanthanum oxide with zinc oxide and/or vanadium oxide; mixtures of lanthanum oxide with iron oxide, cobalt oxide, and/or nickel oxide; mixtures of zirconium oxide with yttrium oxide, zinc oxide, and/or vanadium oxide; and mixtures of zirconium oxide with iron oxide, cobalt oxide, and/or nickel oxide.

In aspects where the independently selected oxide includes one or more alkali metal oxides and one or more transition metal oxides, suitable alkali metal oxides can include, consist essentially of, or be magnesium oxide, calcium oxide, strontium oxide, and/or barium oxide, while suitable transition metals can include, consist essentially of, or be transition metals that can form oxides with the metal in a +2 or +3 oxidation state, such as yttrium oxide, iron oxide, zinc oxide, nickel oxide, vanadium oxide, cobalt oxide, zirconium oxide, lanthanum oxide, and/or other lanthanide oxides. Each of these alkali metal oxides and transition metal oxides can be independently selected individually or in any combination of multiple transition metal oxides. Examples of mixtures can include, consist essentially of, or be a mixture of oxides where at least one oxide is lanthanum oxide, zirconium oxide, and/or magnesium oxide; a mixture of oxides where the mixture includes at least two of lanthanum oxide, zirconium oxide, and magnesium oxide; a mixture of oxides where one oxide is magnesium oxide and/or calcium oxide; and/or a mixture of oxides where at least one oxide is lanthanum oxide, yttrium oxide, and/or zirconium oxide.

In some alternative aspects, a mixed metal oxide can include an alkaline earth carbonate in combination with a transition metal oxide. In such aspects, the alkaline earth carbonate can include, consist essentially of, or be magnesium carbonate and/or calcium carbonate. Additionally or alternately, the alkaline earth carbonate can be present in a mixture with an alkali metal carbonate. Examples of such carbonate mixtures can include, consist essentially of, or be mixtures of lithium carbonate with magnesium carbonate, lithium carbonate with calcium carbonate, potassium carbonate with magnesium carbonate, potassium carbonate with calcium carbonate, sodium carbonate with magnesium carbonate, and sodium carbonate with calcium carbonate (e.g., lithium carbonate with magnesium carbonate or potassium carbonate with magnesium carbonate). In such aspects, suitable transition metals can include, consist essentially of, or be transition metals that can form oxides with the metal in a +2 or +3 oxidation state, such as yttrium oxide, iron oxide, zinc oxide, nickel oxide, vanadium oxide, cobalt oxide, zirconium oxide, lanthanum oxide, other lanthanide oxides, and/or a combination thereof. Each of these alkaline earth carbonates and transition metal oxides can be independently selected individually or in any combination of multiple alkaline earth carbonates and/or multiple transition metal oxides. For the transition metal oxide, one preferred option can include a transition metal oxide selected from lanthanum oxide or zirconium oxide. Another option can include a metal oxide selected from lanthanum oxide, yttrium oxide, zirconium oxide, and/or zinc oxide. Yet another option can include a metal oxide selected from nickel oxide, cobalt oxide, and/or iron oxide. Mixtures within each of these options and/or across options are also contemplated, such as mixtures of oxides where at least one oxide is lanthanum oxide and/or zirconium oxide; mixtures of lanthanum oxide with zinc oxide and/or vanadium oxide; mixtures of lanthanum oxide with iron oxide, cobalt oxide, and/or nickel oxide; mixtures of zirconium oxide with yttrium oxide, zinc oxide, and/or vanadium oxide; and/or mixtures of zirconium oxide with iron oxide, cobalt oxide, and/or nickel oxide.

Additional or alternative materials can include hydrotalcites.

Additionally or alternatively, the present invention can include or more of the following embodiments.

A PSA cycle of column (1+) will now be described. The cycle of column (1+) commences with a high pressure ("PHIGH") feed step, during which feed gas having at least two components A and B is supplied to a feed end of the PSA reactor vessel at PHIGH. An example of a feed gas is the recycled turbine exhaust gas from a low emission power generation system. As the feed gas is supplied to a feed line, the "product," i.e., component B, is generated from a product side, as the component A is adsorbed into the (1+) bed.

After the high pressure feed step, column (1+) is be depressurized to middle pressure ("PMID"). PMID is an intermediate pressure, which is less than PHIGH, but more than a low pressure ("PLOW"). Depressurization enables the adsorbed gas molecules to be released from the adsorbent material in the column. As the pressure of a column decreases, the amount of released adsorbent gas increases in the column. The released adsorbent gas from a column will be referred to as effluent gas. Next, the released effluent gas of column (1+) is purged with the high pressure feed of column (2+). At the same time, column (2−) (also at intermediate pressure) is purged with this effluent, received from column (1+). The communication between columns (1+) and (2−) creates an intermediate A and B product. This intermittent product may be used as product or stored in appropriate storage tanks, and may be used elsewhere in the cycle as purge gas during low-pressure purges. It will be appreciated that the cycle is advantageously performed without the use of compressors.

Next, column (1+) is depressurized to PLOW. After depressurization, column (1+) is purged using the effluents of the complementary column (2−). Purging facilitates the release of the adsorbed component A in column (1+). In this way, no external compression is needed to provide the purge gas for column (1+). Alternatively, column (1+) may be purged by using the effluent of a complementary column (1−) or (2−) stored in an appropriate storage tank at PMID. After purging, column (1+) is re-pressurized to PHIGH. Once re-pressurization is complete, feed gas fed into column (1+) at high pressure during a high feed pressure step. This enables product B to be generated, as component A from the feed gas is adsorbed into column (1+).

The re-pressurization marks the end of the first half of the cycle for column (1+). The second half of the cycle of column (1+) is sequenced in generally the same way as the first half of the cycle, with two exceptions. First, after column (1+) is depressurized to PMID, the column (2−) is purged with the effluent of column (1+) to make an intermittent A and B product rather than column (1−). Second, column (1+) is purged at low pressure by using the purge effluent from column (1−) rather than column (2−).

Next a cycle of column (2+) will be described in reference to the timing of phase 1. Column (2+), like column (1+), is an adsorbent bed selective for component A. As column (1+) commences a high pressure feed step in the cycle, column (2+) is depressurized from PHIGH to PMID. After depressurization, column (2+) is purged with the high pressure feed. The effluent of column (2+) is fed to column (1−), and an intermittent A and B product is created. The product may be stored in an appropriate storage tank and may be used later in the cycle to purge a column at low pressure. The column (2+) is next depressurized from PMID to PLOW, and the remaining adsorbed gas in column (2+) may be purged with the effluent gas of column (2−). This enables column (2+) to be purged without the need for external compressors.

After purging column (2+) of the remaining adsorbed gas, the pressure of column (2+) is re-pressurized to PHIGH. Column (2+) is then fed with feed gas, and the product, i.e., component B, is generated as component A from the feed gas is adsorbed into the column (2+). After this high pressure feed step in column (2+), the pressure of the column is decreased to PMID.

This step concludes the first half of the cycle of column (2+). The second half of the cycle of column (2+) is sequenced in the same way as the first half of the cycle, with two exceptions. First, when column (2+) is depressurized to PMID, column (2−) rather than (1−), is purged with the effluents of column (1+), to make an intermittent A and B. Second, when column (2+) is purged at low pressure, it is fed with the purge effluent of column (1−) rather than column (2−). It will be appreciated that column (1+) continuously generates component B product until column (2+) commences this high pressure feed step. This enables product B to be generated at all times during this cycle. Product B will be generated from either column (1+) or (2+) throughout the cycle.

The cycle of adsorbent column (1−) will be described. In FIG. 1, column (1−) commences the cycle at a re-pressurization step, from PLOW to PMID. After this step, column (1−) is fed the purge effluent of column (2+), which is at PMID, to create an intermittent product A and B. This intermittent product may be stored and used as purge gas for low-pressure purges elsewhere in the cycle using appropriate storage tanks.

Next, column (1−) is re-pressurized to PHIGH. After re-pressurization, feed gas is supplied to the feed end of the column (1−) at PHIGH. In this step, product A can be generated as component B is adsorbed in the column from the feed gas. Following this high feed pressure step, the pressure of column (1−) is reduced to PMID. Afterward, column (1−) is fed with the purge effluent of column (1+), also at PMID, to create an intermittent product A and B. This intermittent product may be stored and used as purge gas for low-pressure purges elsewhere in the cycle using appropriate storage tanks.

Next, column (1−) is re-pressurized to PHIGH. After re-pressurization, feed gas is supplied to the feed end of the column (1−) at PHIGH. In this step product A can be generated as component B is adsorbed in the column. This high pressure feed step is repeated, such that the second high pressure feed step of column (1−) begins as the second high pressure feed step of column (1+) begins. Column (1−) is then depressurized to PLOW. After depressurization, Column (1−) is purged with high pressure product of column (2−), or alternatively, using the intermittent product stored at PMID. The effluent from column (1−) created by this purge is fed to purge column (2+) at low pressure.

After column (1−) is purged, the column is re-pressurized to PHIGH. Next, feed gas is supplied to the feed end of column (1−) at PHIGH. In this step component A can be generated as component B is adsorbed in the column. Column (1−) is then depressurized to PLOW. Column (1−) is then depressurized to PLOW. After depressurization, Column (1−) is purged with high pressure product of column (2−), or alternatively, using the intermittent product stored at PMID. The effluent from column (1−) created by this purge is fed to purge column (1+) at low pressure.

The cycle of column (2−) will now be described. FIG. 1 commences with a high pressure feed step, where product A is generated and component B is adsorbed by column (2−). Next, column (2−) is depressurized to PLOW. After depressurization, Column (2−) is purged using the high pressure product of column (1−), or alternatively, using the intermittent product stored at PMID. The effluent from column (2−) created by this purge is fed to purge column (2+) at low pressure.

After, column (2−) is re-pressurized to PHIGH. Following this step, a high-pressure feed step occurs, where product A is generated and component B is adsorbed by column (2−). Column (2−) is then depressurized to PLOW. After depressurization, Column (2−) is purged using the high pressure product of column (1−), or alternatively, using the intermittent product stored at PMID. The effluent from column (2−) created by this purge is fed to purge column (1+) at low pressure. Column (2−) is then re-pressurized to PMID. After this step, column (2−) is fed the purge effluent of column (2+), which is at PMID, to create an intermittent product A and B. This intermittent product may be stored and used as purge gas for low-pressure purges elsewhere in the cycle using appropriate storage tanks.

Column (2−) is then re-pressurized to PHIGH. Following this step, a high-pressure feed step occurs, where product A is generated and component B is adsorbed by column (2−). After this, column (2−) is de-pressurized to PMID. Next, column (2−) is fed the purge effluent of column (1+), which is at PMID, to create an intermittent product A and B. This intermittent product may be stored and used as purge gas for low-pressure purges elsewhere in the cycle using appropriate storage tanks.

After this, column (2−) is re-pressurized to PHIGH. This is followed by a high-pressure feed step, where product A is generated, i.e. component A, and component B is adsorbed by column (2−). It should be appreciated that at any time column (2−) is generating product A during a high pressure feed step, column (1−) is not. Likewise, whenever column (1−) is generating product A in a high-pressure feed step, column (2−) is not. This cycle has the advantage of generating a continuous supply of product A.

It is appreciated that the pressurization and re-pressurization steps in the first embodiment may be accomplished through "equalizations of pressures" between two different complementary columns. Connecting the columns together, opening the valves on the connecting ends of the columns, and then closing the valves on the other side of the columns enable the equalization of pressure between two complementary columns (i.e. columns of different adsorbent materials). Equalizations of pressure in this matter can increase the energy efficiency of the cycle.

It will be appreciated that the pressures PHIGH, PMID, and PLOW described herein are relative pressures, and the value of each may be adjusted based on the particular components and cycles at hand.

In a second embodiment of this invention, the re-pressurization and depressurization steps discussed in FIG. 1 are replaced with cooling and heating steps, respectively. During these cooling and heating steps, the pressure of the columns is held nominally the same. The heating and cooling steps have the same effect (as pressure is kept constant) as the re-pressurization and depressurization steps in the first embodiment.

Figure 2:
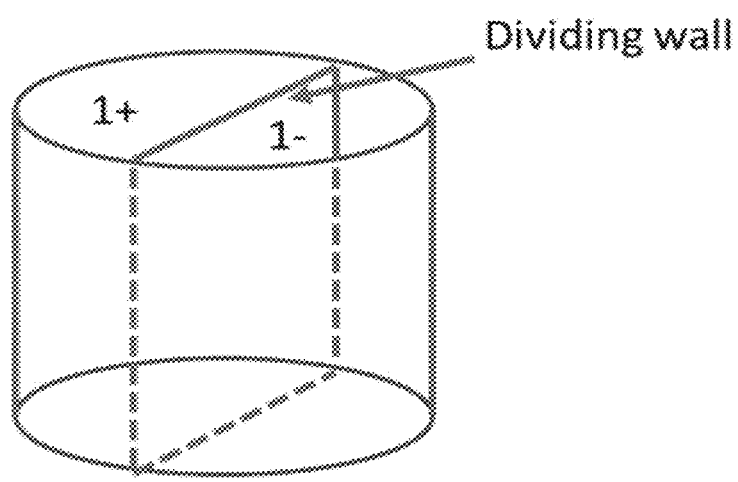
FIG. 2 shows an exemplary adsorbent bed that permits heat transfer between two adsorbent columns.

FIG. 2 shows an example of how the complementary adsorbents can be deployed in an adsorbent column that permits heat transfer between adsorbents. In FIG. 2, two adsorbent beds are placed in a partitioned vessel with common walls. The adsorbent beds are placed coaxially in pairs. Such a divided wall adsorption column offers the advantage of compactness while enabling the heat transfer between adsorbents.

Figure 3:
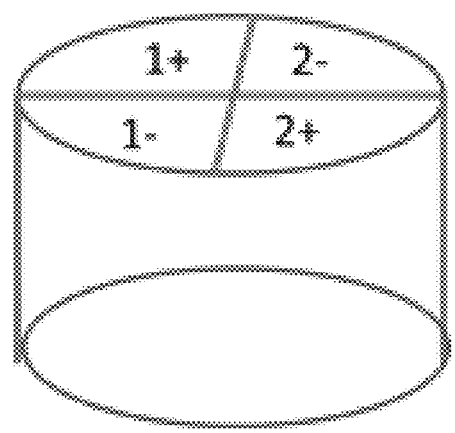
FIG. 3 shows an exemplary compact adsorbent bed that permits heat transfer between four adsorbent columns.

FIG. 3 shows an exemplary compact adsorbent bed that may be used in this invention, which permits heat transfer between four adsorbent columns. FIG. 3 depicts a configuration of the adsorbent columns where they are placed in a partitioned vessel with common walls. The adsorbent columns are placed coaxially in quadruples. The compactness of the adsorbent bed in FIG. 3 additionally allows efficient pressure equalizations between different adsorbent columns (e.g. 1+. 2−) as the columns are situated in close proximity to one another other and thus do not require the use of expensive piping. For the same reason, the effluent of one column can be efficiently discharged to another. The partition separating the adsorbent columns in FIG. 3 may be made of a thermal conducting material such that heat transfer is permitted between adjacent columns.

FIRST EXAMPLE

Figure 4:
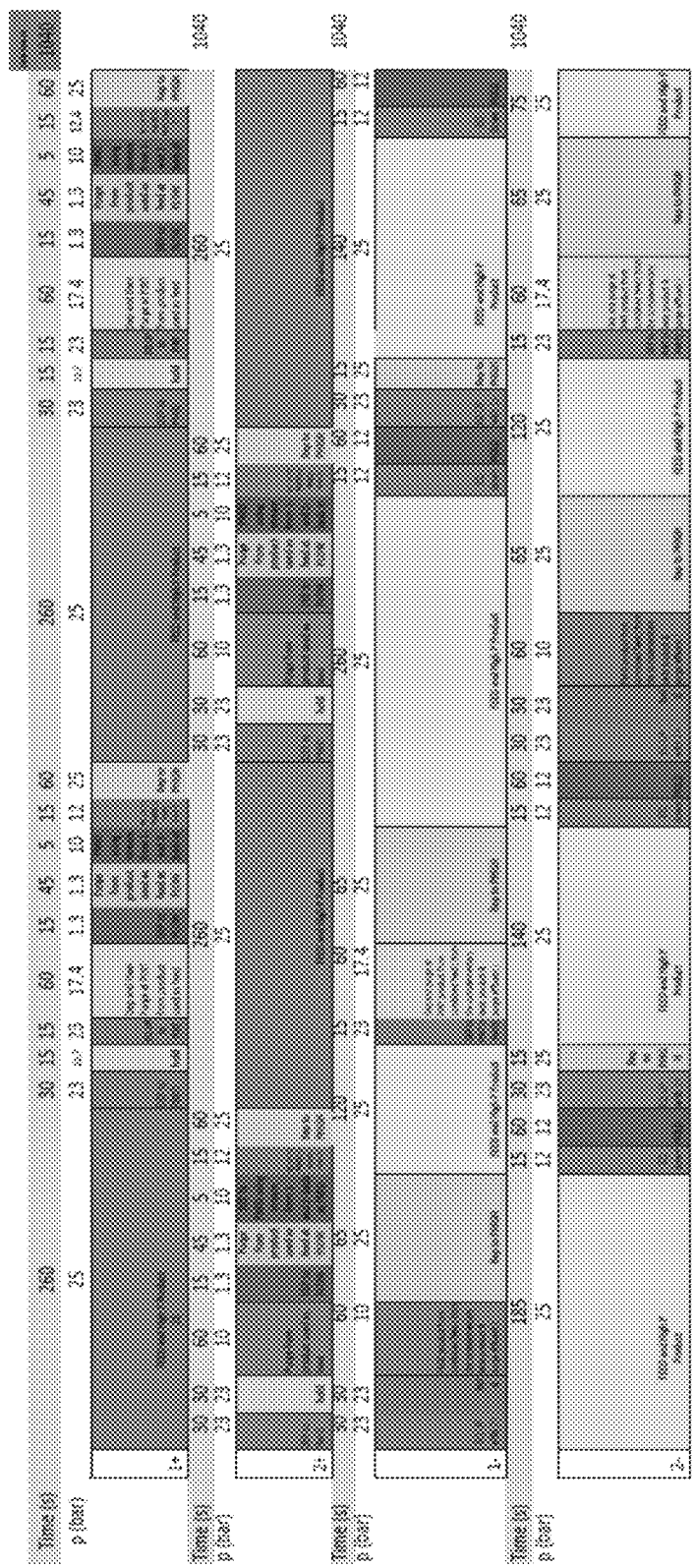
FIG. 4 shows a flow chart depicting the various stages in another exemplary cycle for a four column, staged complementary PSA system used to produce a continuous highly concentrated $CO_2$ and $N_2$ product at minimum energy cost.

A first illustrative example of the deployment of the novel staged complementary PSA cycle in FIG. 4 is now discussed for the separation of a power generation stream of $CO_2/N_2$. Two vessels (denoted as columns 1+ and 2+, respectively) of unit cross-sectional area (1 meter squared) and length of 2 meters are filled with an adsorbent selective for $N_2$ as compared to $CO_2$. A further two vessels (denoted as columns 1− and 2−, respectively) also of unit cross-sectional area (1 meter squared) and a length of 2 meters are filled with an adsorbent selective for $CO_2$ as compared to $N_2$.

The adsorbent material of columns (1+) and (2+) is selective for $N_2$ and may be composed of 4A, NaA zeolite or of LiX zeolite. The adsorbent material of columns (1−) and (2−) is selective for carbon dioxide and may be composed of activated carbons, aluminas, metal organic framework (MOF), mixed metal oxides, hydrotalcites, or a combination of these. The process described in reference to FIG. 4 uses no additional compression and produces an enriched carbon dioxide product containing 93.8 mol % $CO_2$ at a recovery of 70% and an $N_2$ enriched product containing 97.7 mol % $N_2$ at a recovery of 98.8%.

In accordance with the cycle shown in FIG. 4, columns (1+) and (2+) are subjected to a feed step. The feed is composed of 10% $CO_2$ and 90% $N_2$, and is provided at a pressure of 25 bar and temperature of 250 Celsius at a feed rate of 630 kg/hr. Columns (1−) and (2−) are subjected to a feed step with a composition of 10% carbon dioxide and 90% $N_2$ at a pressure of 25 bar and a temperature of 250° C. at a feed rate of 350 kg/hr. Various pressures and times associated with the cycle steps are depicted in FIG. 3 and will be described hereafter.

The cycle of column (1+) will now be described. Column (1+) is first pressurized at 25 bar and fed with a gaseous mixture of carbon dioxide and nitrogen for 260 seconds. $N_2$ is adsorbed in this column, while air with a high concentration of $CO_2$ is generated from the column. Next, column (1+) is depressurized for 30 seconds and brought to a pressure of 23 bar. Simultaneously, column (1+) is connected to column (1−) such that the pressure between the two columns is equalized. The pressure of column (2−) is brought from a pressure of 12 bar to 23 bar. After, the pressure of column (1+) is held for 15 seconds at 22.7 bar. This can be accomplished by closing all of the valves in column (1+). Next, the pressure between column (1+) is equalized with column (1−) for 15 seconds, raising the pressure back up to 23 bar.

Following this step, column (1+) is depressurized to 17.4 bar and then purged using the high pressure product from column (2+). It is appreciated that the effluent from column (1+) in this step is fed to purge column (1−), which create an intermittent $CO_2$ and $N_2$ product at an intermediate pressure (17.4 bar). This illustrates the way that the present invention can purge product without using a compressor.

Column (1+) is then brought to a low pressure, of 1.3 bar, and this step takes approximately 15 seconds. Following this, column (1+) may be purged at this low pressure 45 seconds from the high pressure product of column (2+), alternatively purging could occur from stored intermittent product. Column (1+) next is brought to a pressure of 10 bar, for 5 seconds. This is accomplished by feeding column (1+) with the stream from columns (1−) and (2−) at high pressure. After this, the pressure is raised to 12 bar by equalizing the pressure of column (1+) with column (2−) for 12 seconds. Thus, the pressure of column (1+) is raised from 1.3 bar to 12 bar without using a compressor.

Column (1+) is next re-pressurized to 25 bar by connecting the column with the feed gas for 25 seconds. Afterwards, column (1+) generates highly concentrated carbon dioxide for 260 seconds during a high feed pressure step at 25 bar of pressure. Next, column (1+) is depressurized for 30 seconds and brought to a pressure of 23 bar. The pressure is held constant in column (1+) at 22.7 bar for the next 15 seconds Simultaneously, column (1+) is connecting to column (1−) such that the pressure of column (1−) can be increased. During this time period the pressure of column (1−) is brought from a pressure of 12 bar to 23 bar. After this, the pressure of column (1+) is held for 15 seconds at 23 bar. This can be accomplished by closing all of the valves of column (1+). Following this step, column (1+) is connected to column (2−). For 15 seconds, the pressure between the columns is equalized to an intermediate pressure, around 23 bar.

Following this step, column (1+) is depressurized to 17.4 bar and then purged using the high pressure product from column (2+). It is appreciated that the effluent from column (1+) in this step is fed to purge column (2−), which create an intermittent $CO_2$ and $N_2$ product at an intermediate pressure (17.4 bar). Column (1+) is then depressurized to a low pressure of 1.3 bar. This step takes approximately 15 seconds. Following this, column (1+) is purged for 45 seconds using the high pressure product of column (2+), or, alternatively, with stored intermittent product. Column (1+) can be purged without the use of a compressor. Column (1+) is then brought to a pressure of 10 bar for 5 seconds. This is accomplished by feeding column (1+) with the stream from columns (1−) and (2−) at high pressure. After this, the pressure is raised to 12 bar by equalizing the pressure of column (1+) with column (2−) for 15 seconds. Thus, the pressure of column (1+) is raised from 1.3 bar to 12 bar without the use of compressors. Finally, column (1+) is re-pressurized to 25 bar.

The cycle of column (2+) will now be described. The cycle of column (2+) commences as column (2+) is depressurized from 25 bar to 23 bar over a 30 second period. Simultaneously, column (2+) is connected to column (1−), such that the pressure of column (1−) can be increased while the pressure of column (2−) decreases. During this time period the pressure of column (2−) is brought from a pressure of 12 bar to 23 bar. After this step, the pressure of column (2+) is held for 30 seconds at 23 bar. This can be accomplished by closing all of the valves of column (2+). Following this step, column (2+) is purged using the high pressure product from column (1+). It is appreciated that the effluent from column (2+) in this step is fed to purge column (1−), which creates an intermittent $CO_2$ and $N_2$ product at an intermediate pressure. This intermittent product may be stored and used as purge gas for low-pressure purges elsewhere in the cycle using appropriate storage tanks. During this step the pressure is decreased to 10 bar.

The pressure of column (2+) is then further decreased to 1.3 bar. This step takes approximately 15 seconds. Next, column (2+) is purged at this low pressure for 45 seconds using the high pressure product of column (1+). After, column (2+) can be brought to a pressure of 10 bar for 5 seconds. This is accomplished by feeding column (2+) with the stream from columns (1−) and (2−) at high pressure and closing the other valve of column (2+). The pressure of column (2+) is further raised to 12 bar by equalizing the pressure of column (2+) with column (2−) for 15 seconds. Thus, column (2+) is purged and the pressure of column (2+) is raised from 1.3 bar to 12 bar without the use of compressors.

Column (2+) is next re-pressurized to 25 bar. Column (2+) then generates highly concentrated carbon dioxide for 260 seconds during the high feed pressure step at 25 bar of pressure. Next, column (2+) is depressurized for 30 seconds and brought to a pressure of 23 bar. Simultaneously, column (2+) is connected to column (2−) such that the pressure of the two is equalized. During this time period the pressure of column (2−) is brought from a pressure of 12 bar to 23 bar. After this equalization step, the pressure of column (2+) is held for 15 seconds at 23 bar. This can be accomplished by closing all of the valves on column (2+).

Following this step, column (2+) is purged using the high pressure product from column (1+). It is appreciated that the effluent from column (2+) in this step is fed to purge column (2−), which creates an intermittent $CO_2$ and $N_2$ product at an intermediate pressure. This intermittent product may be stored and used as purge gas for low-pressure purges elsewhere in the cycle using appropriate storage tanks. During this step the pressure is decreased to 10 bar.

Column (2+) is then depressurized to a low pressure of 1.3 bar, which takes approximately 15 seconds. Next, column (2+) is purged for 45 seconds using the high pressure feed of column (1+), or, alternatively, the stored intermittent product. Column (2+) is then brought to a pressure of 10 bar for 5 seconds. This is accomplished by feeding column (2+) with the stream from columns (1−) and (2−) at high pressure. After this, the pressure is raised to 12 bar by equalizing the pressure of column (2+) with column (1−) for 15 seconds. Thus, purging and increasing the pressure of column is accomplished without the use of compressors.

Column (2+) is next re-pressurized to 25 bar. After this, column (2+) is held at 25 bar and fed with a gaseous mixture of $CO_2$ and $N_2$ for 260 seconds. $N_2$ is adsorbed in this column, while air with a high concentration of $CO_2$ can be generated from the column. As can be seen in FIG. 3 and just described, the cycle is coordinated in such a way that either columns (2+) and (1+) are in a high pressure step producing $CO_2$, thus $CO_2$n is continuously generated.

The cycle of column (1−) will now be described. Column (1−) commences the cycle configured to column (2+) such that the pressure of column (1−) equalizes with the pressure of column (2−). In this step, the pressure of column (1−) is increased from 12 bar to 23 bar after 30 seconds. Next, the pressure of column (1−) is held at a constant 23 bar pressure for 30 seconds.

Following this, columns (1−) is fed with the purge effluent of (2+) (at 10 bar); this step create intermittent $CO_2$ and $N_2$ products at 10 bar. During this step, the pressure of column (1−) is decreased from 23 bar to 12 bar over the course of 60 seconds. This intermittent product may be stored and used as purge gas for low-pressure purges elsewhere in the cycle using appropriate storage tanks.

Column (1−) is next re-pressurized from 12 bar to 25 bar over a period of 65 seconds. After this, column (1−) is held at a pressure of 25 bar and fed with the high-pressure feed of the gaseous mixture of $CO_2$ and $N_2$ for 120 seconds. $CO_2$ is adsorbed in this column and air with a high concentration of $N_2$ is generated from the column. After this, column (1−) is depressurized to 23 bar over the course of 15 second. Column (1−) is then further depressurized to 17.4 bar and purged with the effluent of (2+) (at 17.4 bar); this step create intermittent $CO_2$ and $N_2$ products at 17.4 bar over the course of 60 seconds. This intermittent product may be stored and used as purge gas for low-pressure purges elsewhere in the cycle using appropriate storage tanks.

Column (1−) is again re-pressurized from 12 bar to 25 bar over a period of 65 seconds. After this, column (1−) is held at a pressure of 25 bar and fed with the high-pressure feed of the gaseous mixture of $CO_2$ and $N_2$ for 260 seconds. $CO_2$ is adsorbed in this column and air with a high concentration of $N_2$ is generated from the column. Column (1−) is then connected to column (2+), such that the pressure between the columns is equalized to an intermediate pressure, 12 bar. This step takes 15 seconds. Next, the pressure of column (1−) is held at a constant 23 bar pressure for 60 seconds. This occurs until column (1−) is reconnected with column (1+) such that the pressure between the columns is equalized to an intermediate pressure, 23 bar for 30 seconds. Thus, the pressure of column (1−) is raised from 12 to 23 bar without the use of compressors.

Column (1−) is then re-pressurized from 23 bar to 25 bar over a period of 15 seconds. After this, column (1−) is held at a pressure of 25 bar and fed with the high-pressure feed of the gaseous mixture of $CO_2$ and $N_2$ for 140 seconds. Column (1−) is connected with column (1+) such that the pressure between the two can equalize to 12 bar. This takes 15 seconds. Finally, the pressure in column (1−) is held for 60 seconds.

The cycle of column (2−) will now be described. Column (2−) commences the cycle in a high pressure feed step where column (2−) is held at a pressure of 25 bar and fed with the high-pressure feed of the gaseous mixture of $CO_2$ and $N_2$ for 185 seconds. $CO_2$ is adsorbed in this column and air with a high concentration of $N_2$ is generated from the column. Column (2−) is then connected to column (2+), such that the pressure between the columns is equalized to an intermediate pressure, 12 bar. This takes 15 seconds. Next, the pressure of column (2−) is held at a constant 23 bar pressure for 60 seconds. This occurs until the column (2−) is reconfigured with column (1+) such that the pressure between the columns is equalized to an intermediate pressure, 23 bar for 30 seconds. Thus, the pressure of column (2−) is raised from 12 to 23 bar without the use of compressors.

Column (2−) is then re-pressurized from 23 bar to 25 bar over a period of 15 seconds. After this, column (2−) is held at a pressure of 25 bar and fed with the high-pressure feed of the gaseous mixture of $CO_2$ and $N_2$ for 140 seconds. $CO_2$ is adsorbed in this column and air with a high concentration of $N_2$ is generated from the column. Column (2−) is then connected to column (1+), such that the pressure between the columns is equalized to an intermediate pressure, 12 bar. This takes 15 seconds. Next, the pressure of column (2−) is held at a constant 23 bar pressure for 60 seconds. This occurs until column (2−) is reconnected with column (2+), such that the pressure between the columns is equalized to an intermediate pressure of 23 bar for 30 seconds. This is briefly followed by a hold period, where the pressure remains unchanged in column (2−) for 23 seconds. Following this, columns (2−) is purged with the effluent of (2+) (at 10 bar). This step creates intermittent $CO_2$ and $N_2$ products. During this step, the pressure of column (2−) is decreased from 23 bar to 10 bar over the course of 60 seconds.

Column (2−) is next re-pressurized from 10 bar to 25 bar over a period of 65 seconds. After this, column (2−) is held at a pressure of 25 bar and fed with the high-pressure feed of the gaseous mixture of $CO_2$ and $N_2$ for 120 seconds. $CO_2$ is adsorbed in this column and air with a high concentration of $N_2$ is generated from the column. Following this step, column (2−) is connected to columns (1−) and the pressure is equalized between them to 23 bar. This takes 15 seconds. Following this, columns (2−) is depressurized to 17.4 bar and purged using the effluent of column (1−) at 17.4 bar. This takes 60 seconds and creates an intermittent $CO_2$ and $N_2$ product.

Column (2−) is then re-pressurized from 12 bar to 25 bar over a period of 65 seconds. After this, column (1−) is held at a pressure of 25 bar and fed with the high-pressure feed of the gaseous mixture of $CO_2$ and $N_2$ for 25 seconds. $CO_2$ is adsorbed in this column and air with a high concentration of $N_2$ is generated from the column. As can be seen in FIG. 3 and just described, columns (2−) and (1−) are configured in such a way that a high concentration of carbon dioxide is continuously produced throughout the cycle.

SECOND EXAMPLE

Figure 5:
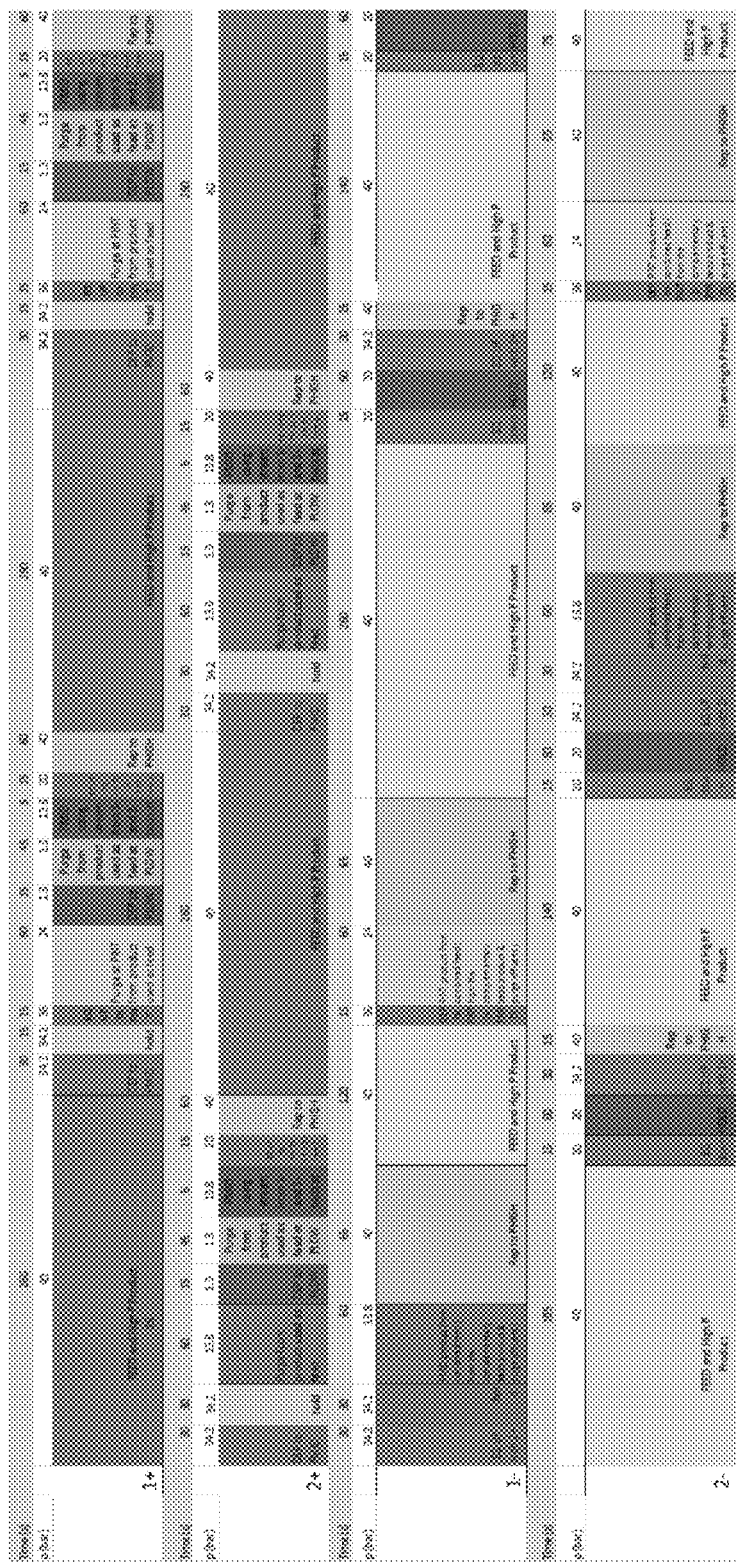
FIG. 5 shows a flow chart depicting the various stages in another exemplary cycle for a four column, staged complementary PSA system used to produce a continuous highly concentrated $CH_4$ product from a mixture of $N_2$ and $CH_4$ at minimum energy cost.

A second illustrative example of the deployment of the novel staged complementary PSA cycle in FIG. 5 is now discussed for the separation of $CH_4//N_2$. This process described hereafter may advantageously be used after power generation. Two vessels (denoted as columns 1+ and 2+, respectively) of unit cross-sectional area (1 meter squared) and length of 2 meters are filled with an adsorbent selective for $CH_4$ as compared to $N_2$. A further two vessels (denoted as columns 1− and 2−, respectively) also of unit cross-sectional area (1 meter squared) and a length of 2 meters are filled with an adsorbent selective for $N_2$ as compared to $CH_4$.

Adsorbent material more selective for $CH_4$ than $N_2$ can be chosen from H/Na Mordenite, activated carbons, aluminas, metal organic framework (MOF), mixed metal oxides, hydrotalcites or combinations thereof. Adsorbent materials more selective for $N_2$ than $CH_4$ can be chosen from molecular sieves such clinoptilolite, rho-zeolite or ITQ as well as carbon molecular sieve. The columns (1+) and (2+) in this example are subjected to a feed step with the composition of 10% $N_2$ and 90% $CH_4$, a pressure of 30 bar, a temperature of 50° C. and a feed rate of 486 kg/hr. The columns (1−) and (2−) in this example are subjected to a feed step with the composition of 10% $N_2$ and 90%, $CH_4$, a pressure of 30 bar, a temperature of 50° C. and a feed rate of 583 kg/hr. Various pressures and times associated with the cycle steps are as shown on in FIG. 3

The second example uses no additional compression and produces a methane enriched product containing 95.8 mol % $CH_4$ at a recovery of 93.8%. It will be appreciated that in order to produce this highly enriched constant product the ratio of feed time to total cycle time for a given adsorbent bed selective for $CH_4$ may be set between 0.3 to 0.7, and preferably is 0.5. The ratio for purge time to total cycle time for a given adsorbent bed selective for $CH_4$ is optimized between ranges of 0.15 and 0.25, and preferably set at 0.2.

The cycle may be configured to produce highly enriched $CH_4$ product by setting the ratio of feed times to total cycle times of a given column selective for $N_2$ to approximately between 0.6 and 0.4, and may be preferably set to 0.5. The ratio of purge times to total cycle times of a given column selective for $N_2$ is optimally set to approximately between 0.08 and 0.16, and may be preferably set to 0.12.

The cycle of column (1+) will now be described. Column (1+) is first pressurized at 40 bar and fed with a gaseous mixture of $CH_4$ and $N_2$ for 260 seconds. $CH_4$ is adsorbed in this column, while air with a high concentration of $N_2$ is generated from the column. Next, column (1+) is depressurized for 30 seconds and brought to a pressure of 34.2 bar. Simultaneously, column (1+) is connected to column (1−) such that the pressure between the two columns is equalized. The pressure of column (2−) is brought from a pressure of 20 bar to 34.2 bar. After, the pressure of column (1+) is held for 15 seconds at 34.2 bar. This can be accomplished by closing all of the valves in column (1+). Next, the pressure between column (1+) is equalized with column (1−) for 15 seconds, raising the pressure back up to 36 bar.

Following this step, column (1+) is depressurized to 24 bar and then purged using the high pressure product from column (2+). It is appreciated that the effluent from column (1+) in this step is fed to purge column (1−), which create an intermittent $CH_4$ and $N_2$ product at an intermediate pressure (24 bar). This illustrates the way that the present invention can purge product without using compressors.

Column (1+) is then brought to a low pressure, of 1.3 bar, this step takes approximately 15 seconds. Following this, column (1+) may be purged at this low pressure 45 seconds from the high pressure product of column (2+), alternatively purging could occur from stored intermittent product. Column (1+) next is brought to a pressure of 13.8 bar, for 5 seconds. This is accomplished by feeding column (1+) with the stream from columns (1−) and (2−) at high pressure. After this, the pressure is raised to 20 bar by equalizing the pressure of column (1+) with column (2−) for 20 seconds. Thus, the pressure of column (1+) is raised from 1.3 bar to 20 bar without the use of compressors.

Column (1+) is next re-pressurized to 40 bar by connecting the column with the feed gas for 40 seconds. Afterwards, column (1+) generates highly concentrated $N_2$ for 260 seconds during a high feed pressure step at 40 bar of pressure. Next, column (1+) is depressurized for 30 seconds and brought to a pressure of 34.2 bar. The pressure is held constant in column (1+) at 34.2 bar for the next 15 seconds Simultaneously, column (1+) is connecting to column (1−) such that the pressure of column (1−) can be increased. During this time period the pressure of column (1−) is brought from a pressure of 20 bar to 36 bar. After this, the pressure of column (1+) is held for 15 seconds at 34.2 bar. This can be accomplished by closing all of the valves of column (1+). Following this step, column (1+) is connected to column (2−). For 15 seconds, the pressure between the columns is equalized to an intermediate pressure, around 36 bar.

Following this step, column (1+) is depressurized to 24 bar and then purged using the high pressure product from column (2+). It is appreciated that the effluent from column (1+) in this step is fed to purge column (2−), which create an intermittent $CH_4$ and $N_2$ product at an intermediate pressure (24 bar). Column (1+) is then depressurized to a low pressure of 1.3 bar. This step takes approximately 15 seconds. Following this, column (1+) is purged for 45 seconds using the high pressure product of column (2+), or, alternatively, with stored intermittent product. Thus column (1+) can be purged without the use of a compressor. Column (1+) is then brought to a pressure of 13.8 bar for 5 seconds. This is accomplished by feeding column (1+) with the stream from columns (1−) and (2−) at high pressure. After this, the pressure is raised to 20 bar by equalizing the pressure of column (1+) with column (2−) for 15 seconds. Thus, the pressure of column (1+) is raised from 1.3 bar to 20 bar without the use of compressors. Finally, column (1+) is re-pressurized to 40 bar.

The cycle of column (2+) will now be described. The cycle of column (2+) commences as column (2+) is depressurized from 40 bar to 34.2 bar over a 30 second period. Simultaneously, column (2+) is connected to column (1−), such that the pressure of column (1−) can be increased while the pressure of column (2−) decreases. During this time period the pressure of column (2−) is brought from a pressure of 20 bar to 34.2 bar. After this step, the pressure of column (2+) is held for 30 seconds at 34.2 bar. This can be accomplished by closing all of the valves of column (2+).

Following this step, column (2+) is purged using the high pressure product from column (1+). It is appreciated that the effluent from column (2+) in this step is fed to purge column (1−), which creates an intermittent $CH_4$ and $N_2$ product at an intermediate pressure. This intermittent product may be stored and used as purge gas for low-pressure purges elsewhere in the cycle using appropriate storage tanks. During this step the pressure is decreased to 13.8 bar.

The pressure of column (2+) is then further decreased to 1.3 bar. This step takes approximately 15 seconds. Next, column (2+) is purged at this low pressure for 45 seconds using the high pressure product of column (1+). After, column (2+) can be brought to a pressure of 13.8 bar for 5 seconds. This is accomplished by feeding column (2+) with the stream from columns (1−) and (2−) at high pressure and closing the other valve of column (2+). The pressure of column (2+) is further raised to 20 bar by equalizing the pressure of column (2+) with column (2−) for 15 seconds. Thus, column (2+) is purged and the pressure of column (2+) is raised from 1.3 bar to 20 bar without the use of compressors.

Column (2+) is next re-pressurized to 40 bar. Column (2+) then generates highly concentrated $N_2$ for 260 seconds during the high feed pressure step at 40 bar of pressure. Next, column (2+) is depressurized for 30 seconds and brought to a pressure of 34.2 bar. Simultaneously, column (2+) is connected to column (2−) such that the pressure of the two is equalized. During this time period the pressure of column (2−) is brought from a pressure of 20 bar to 34.2 bar. After this equalization step, the pressure of column (2+) is held for 15 seconds at 34.2 bar. This can be accomplished by closing all of the valves on column (2+).

Following this step, column (2+) is purged using the high pressure product from column (1+). It is appreciated that the effluent from column (2+) in this step is fed to purge column (2−), which creates an intermittent $CH_4$ and $N_2$ product at an intermediate pressure. This intermittent product may be stored and used as purge gas for low-pressure purges elsewhere in the cycle using appropriate storage tanks. During this step the pressure is decreased to 13.8 bar.

Column (2+) is then depressurized to a low pressure of 1.3 bar, which takes approximately 15 seconds. Next, column (2+) is purged for 45 seconds using the high pressure feed of column (1+), or, alternatively, the stored intermittent product. Column (2+) is then brought to a pressure of 13.8 bar for 5 seconds. This is accomplished by feeding column (2+) with the stream from columns (1−) and (2−) at high pressure. After this, the pressure is raised to 20 bar by equalizing the pressure of column (2+) with column (1−) for 15 seconds. Thus, purging and increasing the pressure of column is accomplished without the use of compressors.

Column (2+) is next re-pressurized to 40 bar. After this, column (2+) is held at 40 bar and fed with a gaseous mixture of $CH_4$ and $N_2$ for 260 seconds. $CH_4$ is adsorbed in this column, while air with a high concentration of $N_2$ can be generated from the column.

The cycle of column (1−) will now be described. Column (1−) commences the cycle connected to column (2+) such that the pressure of column (1−) equalizes with the pressure of column (2−). In this step, the pressure of column (1−) is increased from 20 bar to 34.2 bar after 30 seconds. Next, the pressure of column (1−) is held at a constant 34.2 bar pressure for 30 seconds. Following this, columns (1−) is fed with the purge effluent of (2+) (at 13.8 bar); this step creates intermittent $CH_4$ and $N_2$ products at 13.8 bar. During this step, the pressure of column (1−) is decreased from 34.2 bar to 20 bar over the course of 60 seconds. This intermittent product may be stored and used as purge gas for low-pressure purges elsewhere in the cycle using appropriate storage tanks.

Column (1−) is next re-pressurized from 20 bar to 40 bar over a period of 65 seconds. After this, column (1−) is held at a pressure of 40 bar and fed with the high-pressure feed of the gaseous mixture of $CH_4$ and $N_2$ for 200 seconds. $N_2$ is adsorbed in this column and air with a high concentration of $CH_4$ is generated from the column. After this, column (1−) is depressurized to 36 bar over the course of 15 second. Column (1−) is then further depressurized to 24 bar and purged with the effluent of (2+) (at 24 bar); this step create intermittent $CH_4$ and $N_2$ products at 24 bar over the course of 60 seconds. This intermittent product may be stored and used as purge gas for low-pressure purges elsewhere in the cycle using appropriate storage tanks.

Column (1−) is again re-pressurized from 20 bar to 40 bar over a period of 65 seconds. After this, column (1−) is held at a pressure of 40 bar and fed with the high-pressure feed of the gaseous mixture of $CH_4$ and $N_2$ for 260 seconds. $N_2$ is adsorbed in this column and air with a high concentration of $CH_4$ is generated from the column. Column (1−) is then connected to column (2+), such that the pressure between the columns is equalized to an intermediate pressure, 20 bar. This takes 15 seconds. Next, the pressure of column (1−) is held at a constant 20 bar pressure for 60 seconds. This occurs until column (1−) is reconnected with column (1+) such that the pressure between the columns is equalized to an intermediate pressure, 34.2 bar for 30 seconds. Thus, the pressure of column (1−) is raised from 20 to 34.2 bar without the use of compressors.

Column (1−) is then re-pressurized from 34.2 bar to 40 bar over a period of 15 seconds. After this, column (1−) is held at a pressure of 40 bar and fed with the high-pressure feed of the gaseous mixture of $CH_4$ and $N_2$ for 140 seconds, as highly concentrated $CH_4$ is produced. Next Column (1−) is connected with column (1+) such that the pressure between the two can equalize to 20 bar. This takes 15 seconds. Finally, the pressure in column (1−) is held for 60 seconds.

The cycle of column (2−) will now be described. Column (2−) commences the cycle in a high pressure feed step where column (2−) is held at a pressure of 40 bar and fed with the high-pressure feed of the gaseous mixture of $CH_4$ and $N_2$ for 185 seconds. $N_2$ is adsorbed in this column and air with a high concentration of $CH_4$ is generated from the column. Column (2−) is then connected to column (2+), such that the pressure between the columns is equalized to an intermediate pressure, 20 bar. This takes 15 seconds. Next, the pressure of column (2−) is held at a constant 20 bar pressure for 60 seconds. This occurs until the column (2−) is reconnected with column (1+) such that the pressure between the columns is equalized to an intermediate pressure, 34.2 bar for 30 seconds. Thus, the pressure of column (2−) is raised from 20 to 34.2 bar without the use of compressors.

Column (2−) is then re-pressurized from 34.2 bar to 40 bar over a period of 15 seconds. After this, column (2−) is held at a pressure of 40 bar and fed with the high-pressure feed of the gaseous mixture of $CH_4$ and $N_2$ for 140 seconds. $N_2$ is adsorbed in this column and air with a high concentration of $CH_4$ is generated from the column. Column (2−) is then connected to column (1+), such that the pressure between the columns is equalized to an intermediate pressure, 20 bar. This takes 15 seconds. Next, the pressure of column (2−) is held at a constant 34.2 bar pressure for 60 seconds. This occurs until column (2−) is reconnected with column (2+), such that the pressure between the columns is equalized to an intermediate pressure of 34.2 bar for 30 seconds. This is briefly followed by a hold period, where the pressure remains unchanged in column (2−) for 34.2 seconds. Following this, columns (2−) is purged with the effluent of (2+) (at 13.8 bar). This step creates intermittent $CH_4$ and $N_2$ products. During this step, the pressure of column (2−) is decreased from 34.2 bar to 13.8 bar over the course of 60 seconds.

Column (2−) is next re-pressurized from 13.8 bar to 40 bar over a period of 65 seconds. After this, column (2−) is held at a pressure of 40 bar and fed with the high-pressure feed of the gaseous mixture of $CH_4$ and $N_2$ for 200 seconds. $N_2$ is adsorbed in this column and air with a high concentration of $CH_4$ is generated from the column. Following this step, column (2−) is connected to columns (1−) and the pressure is equalized between them to 34.2 bar. This takes 15 seconds. Following this, columns (2−) is depressurized to 24 bar and purged using the effluent of column (1−) at 24 bar. This takes 60 seconds and creates an intermittent $CH_4$ and $N_2$ product.

Column (2−) is then re-pressurized from 20 bar to 40 bar over a period of 65 seconds. After this, column (1−) is held at a pressure of 40 bar and fed with the high-pressure feed of the gaseous mixture of $CH_4$ and $N_2$ for 40 seconds. $N_2$ is adsorbed in this column and air with a high concentration of $CH_4$ is generated from the column. As can be seen in FIG. 4 and just described, columns (2−) and (1−) are connected in such a way that a high concentration of $CH_4$ is continuously produced throughout the cycle.

The embodiments and examples described herein are merely illustrative, as numerous other embodiments may be implemented without departing from the spirit and scope of the exemplary embodiments of the present application. Moreover, while certain features of the application may be shown on only certain embodiments or configurations, these features may be exchanged, added, and removed from and between the various embodiments or configurations while remaining within the scope of the application. Likewise, methods described and disclosed may also be performed in various sequences, with some or all of the disclosed steps being performed in a different order than described while still remaining within the spirit and scope of the present application.

The invention claimed is:

1. A method for fractionation of a multicomponent stream having first and second components and for providing a continuous purified supply of said multicomponent stream using a pressure swing adsorption system having a first adsorption column selective for a first component and a second adsorption column selective for a second component, which comprises steps of:
   a) feeding said first adsorption column, selective for the first component, at a high pressure with a stream of the multicomponent gas and generating a product comprising the second component;
   b) depressurizing said first adsorption column to a first intermediate pressure, which is between the high pressure and a low pressure;
   c) purging said first adsorption column at a second intermediate pressure by using the product comprising the second component or a purge effluent of the second adsorption column selective for the second component;
   d) depressurizing said first adsorption column from a third intermediate pressure to the low pressure;
   e) purging said first adsorption column at the low pressure by using the product comprising the second component; and f) increasing the pressure of said first adsorption column from the low pressure to the high pressure.

2. The method of claim 1, wherein said first adsorption column is connected to said second adsorption column selective for the second component to enable pressure between said first adsorption column and said second adsorption column to equalize without use of a compressor.

3. The method of claim 1, wherein the first, second and third intermediate pressures are the same.

4. The method of claim 1, wherein the pressure swing adsorption system performing the method includes four adsorption columns, including the first and second adsorption columns, with two adsorption columns including an adsorbent selective for nitrogen and two adsorption columns including an adsorbent selective for carbon dioxide.

5. The method of claim 4, wherein the four adsorption columns are placed in a partitioned vessel with common walls.

6. The method of claim 4, wherein at least two of the four adsorption columns are placed in a partitioned vessel with common walls.

7. The method of claim 2, wherein the pressure swing adsorption system performing the method includes four adsorption columns, including the first and second adsorption columns, with two of the four adsorption columns including an adsorbent selective for nitrogen and two of the four adsorption columns including an adsorbent selective for carbon dioxide.

8. The method of claim 1, wherein the pressure swing adsorption system performing the method includes four adsorption columns, including the first and second adsorption columns, with two of the four adsorption columns including an adsorbent selective for nitrogen and two of the four adsorption columns including an adsorbent selective for methane.

9. The method of claim 7, wherein
the adsorbent selective for nitrogen is selected from the group consisting of 4A and NaA zeolite;
the adsorbent selective for carbon dioxide is selected from the group consisting of activated carbons, aluminas, metal organic framework, mixed metal oxides, hydrotalcites and combinations thereof.

10. The method of claim 8, wherein
the adsorbent selective for methane is selected from the group consisting of H/Na mordenite, activated carbons, aluminas, metal organic framework, mixed metal oxides, hydrotalcites and combinations thereof;
the adsorbent selective for nitrogen is selected from the group consisting of clinoptilolite, rho-zeolite, ITQ or carbon molecular sieve and combinations thereof.

11. The method of claim 8, wherein
a ratio of time that an adsorbent column, which is one of the columns selective for methane, is fed with the multicomponent gas while pressurized at a high pressure to total cycle time is between 0.4 and 0.6;
a ratio of time that the adsorbent column, which is selective for methane, purged to the total cycle time is between 0.15 and 0.25;
a ratio of time that an adsorbent column, which is one of the columns selective for nitrogen, is fed with a multicomponent fluid while pressurized at a high pressure to total cycle time is between 0.4 and 0.6; and
a ratio of time that the adsorbent column, which is selective for nitrogen, is purged to the total cycle time is between 0.08 and 0.16.

12. The method of claim 1, wherein the pressure swing adsorption system performing the method includes four adsorption columns, including the first and second adsorption columns, with two adsorption columns including an adsorbent selective for nitrogen and two adsorption columns including an adsorbent selective for oxygen.

13. The method of claim 1, wherein the pressure swing adsorption system performing the method includes four adsorption columns, including the first and second adsorption columns, with two adsorption columns including an adsorbent selective for propane and two adsorbent columns including an adsorbent selective for propylene.

14. The method of claim 1, wherein the pressure swing adsorption system performing the method includes four adsorption columns, including the first and second adsorption columns, with two adsorption columns including an adsorbent selective for ethane and two adsorbent columns including an adsorbent selective for ethylene.

15. A method for fractionation of a multicomponent stream having first and second components and for providing a continuous purified supply of said multicomponent stream using a thermal swing adsorption system, wherein a first adsorption column is used that is selective for the first component and a second adsorption column is used that is selective for the second component, which comprises of steps of:
a) feeding the first adsorption column, selective for the first component, at a first high temperature with a stream of the multicomponent stream and generating a product comprising the second component;
b) decreasing the temperature of said first adsorption column by coming to thermal equilibrium with another adsorption column which is at a first low temperature;
c) purging said first adsorption column at a first intermediate temperature by using the product comprising the second component or a purge effluent of the second adsorption column selective for the second component;
d) purging said first adsorption column at a second low temperature by using the product comprising the second component; and
e) increasing the temperature of said first adsorption column from a third low temperature to a second high temperature, by coming to thermal equilibrium with another adsorption column which is at higher temperature than said first adsorption column.

16. The method of claim 15, wherein the thermal swing adsorption system operates without use of a compressor.

17. The method of claim 15, wherein the first, second, and third low temperatures are the same.

18. The method of claim 15, wherein the first and second high temperatures are the same.

19. The method of claim 15, wherein the thermal swing adsorption system that performs the method includes four adsorption columns, including the first and second adsorption columns, which are placed in a partitioned vessel with common walls; wherein
the common walls are thermally conductive.

20. The method of claim 15, wherein the thermal swing adsorption system that performs the method includes four adsorption columns, including the first and second adsorption columns, with at least two of the four adsorption columns being placed in a partitioned vessel with common walls; wherein
the common walls are thermally conductive.

21. The method of claim 15, wherein the thermal swing adsorption system performing the method includes four adsorption columns, including the first and second adsorption columns, with two of the four adsorption columns including an adsorbent selective for nitrogen and two of the four adsorption columns including an adsorbent selective for carbon dioxide.

22. The method of claim 15, wherein the thermal swing adsorption system performing the method includes four adsorption columns, including the first and second adsorption columns, with two of the four adsorption columns including an adsorbent selective for nitrogen and two of the four adsorption columns including an adsorbent selective for methane.

23. The method of claim 15, wherein the thermal swing adsorption system performing the method includes four adsorption columns, including the first and second adsorption columns, with two of the four adsorption columns including an adsorbent selective for nitrogen and two of the four columns including an adsorbent selective for oxygen.

24. The method of claim 15, wherein the thermal swing adsorption system performing the method includes four adsorption columns, including the first and second adsorption columns, with two of the four columns including an adsorbent selective for propane and two of the four columns including an adsorbent selective for propylene.

25. The method of claim 15, wherein the thermal swing adsorption system performing the method includes four adsorption columns, including the first and second adsorption columns, with two of the four columns including an adsorbent selective for ethane and two of the four columns including an adsorbent selective for ethylene.

* * * * *